(12) United States Patent
Cyrus

(10) Patent No.: US 12,494,738 B2
(45) Date of Patent: Dec. 9, 2025

(54) VEHICLE SOLAR CHARGING SYSTEM

(71) Applicant: Babak Cyrus, Rocklin, CA (US)

(72) Inventor: Babak Cyrus, Rocklin, CA (US)

( * ) Notice: Subject to any disclaimer, the term of this patent is extended or adjusted under 35 U.S.C. 154(b) by 125 days.

(21) Appl. No.: 18/495,069

(22) Filed: Oct. 26, 2023

(65) Prior Publication Data

US 2024/0146238 A1 May 2, 2024

Related U.S. Application Data

(60) Provisional application No. 63/419,796, filed on Oct. 27, 2022.

(51) Int. Cl.
*H02S 30/20* (2014.01)
*B60L 8/00* (2006.01)

(52) U.S. Cl.
CPC .............. *H02S 30/20* (2014.12); *B60L 8/003* (2013.01)

(58) Field of Classification Search
CPC ................................ H02S 30/20; B60L 8/003
See application file for complete search history.

(56) References Cited

U.S. PATENT DOCUMENTS

| | | | |
|---|---|---|---|
| 1,999,171 A | 4/1935 | Bryant | |
| 3,326,497 A * | 6/1967 | Michelson | B64G 1/443 343/705 |
| 3,690,080 A * | 9/1972 | Dillard | B64G 1/443 244/172.6 |
| 3,733,758 A | 5/1973 | Maier et al. | |
| 4,592,436 A * | 6/1986 | Tomei | B60L 53/30 180/2.2 |
| 4,718,711 A | 1/1988 | Rabbit | |
| 4,925,234 A | 5/1990 | Park et al. | |
| 4,929,016 A | 5/1990 | Kastanis | |
| 4,958,881 A | 9/1990 | Piros | |
| 5,294,167 A | 3/1994 | Yu | |
| 5,378,035 A | 1/1995 | Wu | |
| 5,433,259 A * | 7/1995 | Faludy | H10F 77/169 160/67 |
| 5,516,181 A | 5/1996 | Thompson | |
| 6,010,096 A | 1/2000 | Baghdasarian | |
| 6,092,857 A | 7/2000 | Rivas | |
| 6,513,858 B1 | 2/2003 | Li et al. | |
| 9,196,771 B2 | 11/2015 | Rodin et al. | |
| 10,336,171 B2 | 7/2019 | Chaul, Sr. | |
| 10,560,050 B2 | 2/2020 | Raghunathan | |

(Continued)

FOREIGN PATENT DOCUMENTS

| | | |
|---|---|---|
| CN | 204029827 | 12/2014 |
| CN | 211893008 | 11/2020 |

OTHER PUBLICATIONS https://www.amazon.com/WHZ-Automatic-Retractable-Shelter-Control/dp/B08HPSXR7B7th=1, accessed Oct. 26, 2023.

*Primary Examiner* — Sadie White
(74) *Attorney, Agent, or Firm* — Thorpe North & Western, LLP

(57) ABSTRACT

A solar system for a vehicle has an array of solar wings each with a series of interconnected solar panels movable between a retracted configuration in a stack on the vehicle and a deployed configuration extending from the vehicle. Each wing can have a motor and a controller to sequentially deploy and retract each solar wing in the array of solar wings. A drive can be coupled between the motor and the solar panels of a solar wing.

20 Claims, 7 Drawing Sheets

(56) References Cited

U.S. PATENT DOCUMENTS

| | | |
|---|---|---|
| 10,958,209 B2 | 3/2021 | Al-Haddad |
| 11,509,259 B2 | 11/2022 | Liu et al. |
| 11,545,731 B2 | 1/2023 | Turse |
| 2004/0238089 A1 | 12/2004 | Li et al. |
| 2006/0232095 A1 | 10/2006 | Sedighzadeh |
| 2007/0107768 A1* | 5/2007 | Romana .................. H02S 10/40 |
| | | 136/244 |
| 2009/0114264 A1* | 5/2009 | Giampietro ............ H02S 30/20 |
| | | 114/343 |
| 2010/0065104 A1* | 3/2010 | Baruh .................... F24S 20/50 |
| | | 126/621 |
| 2010/0193260 A1* | 8/2010 | Freeman ................ B60K 16/00 |
| | | 180/2.2 |
| 2011/0253614 A1 | 10/2011 | Curran et al. |
| 2012/0313569 A1* | 12/2012 | Curran ................... H02S 30/20 |
| | | 136/246 |
| 2014/0000667 A1 | 1/2014 | Biers, Sr. |
| 2016/0193905 A1 | 7/2016 | Joseph |
| 2017/0063290 A1* | 3/2017 | Kurlagunda ............ B60L 8/003 |
| 2018/0102734 A1* | 4/2018 | Katz ...................... E04F 10/06 |
| 2019/0386606 A1* | 12/2019 | Raghunathan .......... H02S 40/10 |
| 2021/0323430 A1* | 10/2021 | Kulik ..................... B60L 8/003 |
| 2023/0406113 A1* | 12/2023 | Srivathsan ............. B60K 16/00 |

* cited by examiner

VEHICLE SOLAR CHARGING SYSTEM

PRIORITY CLAIM

Priority is claimed to U.S. Provisional Patent Application Ser. No. 63/419,796, filed Oct. 27, 2022, which is hereby incorporated herein by reference.

BACKGROUND

Vehicles continue to transition to electric propulsion requiring an electrical power source. In addition, recreation vehicles can utilize electrical power not only for propulsion, but for accessories as well. These vehicles can travel where electrical power is limited or unavailable.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
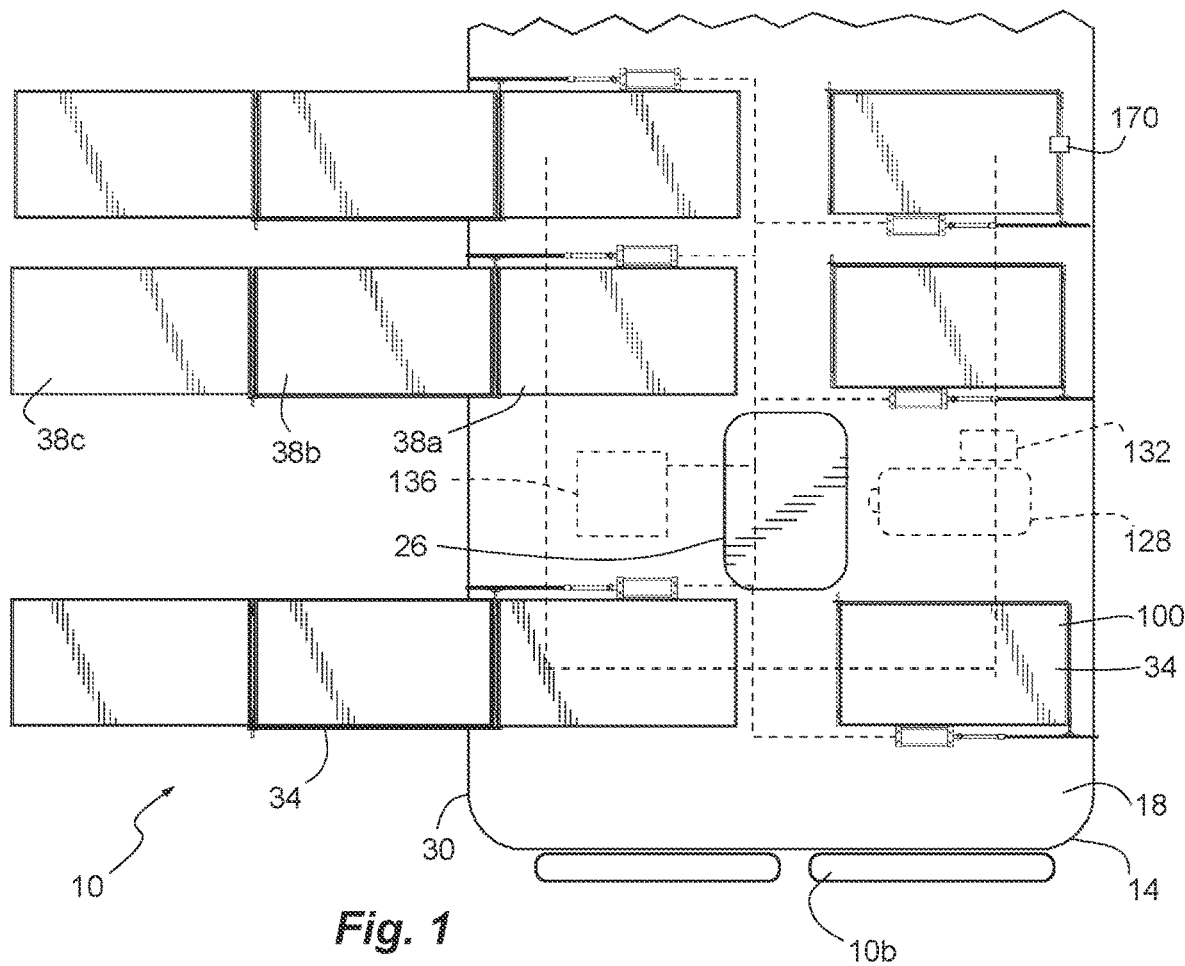
FIG. 1 is a partial top view of a vehicle solar charging system in accordance with an example, shown with a vehicle.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Described herein are examples of system and methods for providing electrical power to a vehicle via solar energy. The vehicle can be, for example, a recreational vehicle (RV), such as a motor home or a travel trailer; or a passenger or utility vehicle, such as a van or a travel trailer. Such vehicles can have a roof that can be utilized for gathering solar energy, such as with solar panels. The roof area, however, may be interrupted by structures associated with the vehicle, such as an air-conditioning (AC) units, an antenna, a sun roof, a vent, a cargo container, etc. These structures may be located without thought to the roof area; making it difficult to position solar panels. In addition, the available roof area may not correspond to the amount of electrical power used by the vehicle.

The vehicle solar charging systems described herein can be sized and positioned to allow for custom or selective placement on the roof of the vehicle. An array of solar panels can be located on the roof and positioned between the roof structures. The array of solar panels can be coupled together, and/or to a rechargeable battery carried by the vehicle. In addition, the vehicle solar systems can be selectively extended beyond a perimeter of the roof when the vehicle is at rest or motionless. The solar panels can include solar wings with a series of panels that are hinged together and that can be expanded and retracted. The solar wings can be positioned proximate to an outer perimeter of the roof, and can fold out beyond the perimeter of the roof to increase the surface area available to interact with solar rays. The solar wings can have a retracted configuration in which the panels are folded together in a stack on the roof, and a deployed configuration in which the panels extend beyond the perimeter of the roof. Furthermore, the solar wings can be configured to be selectively and sequentially deployed and retracted to reduce strain on the rechargeable battery.

Figure 2:
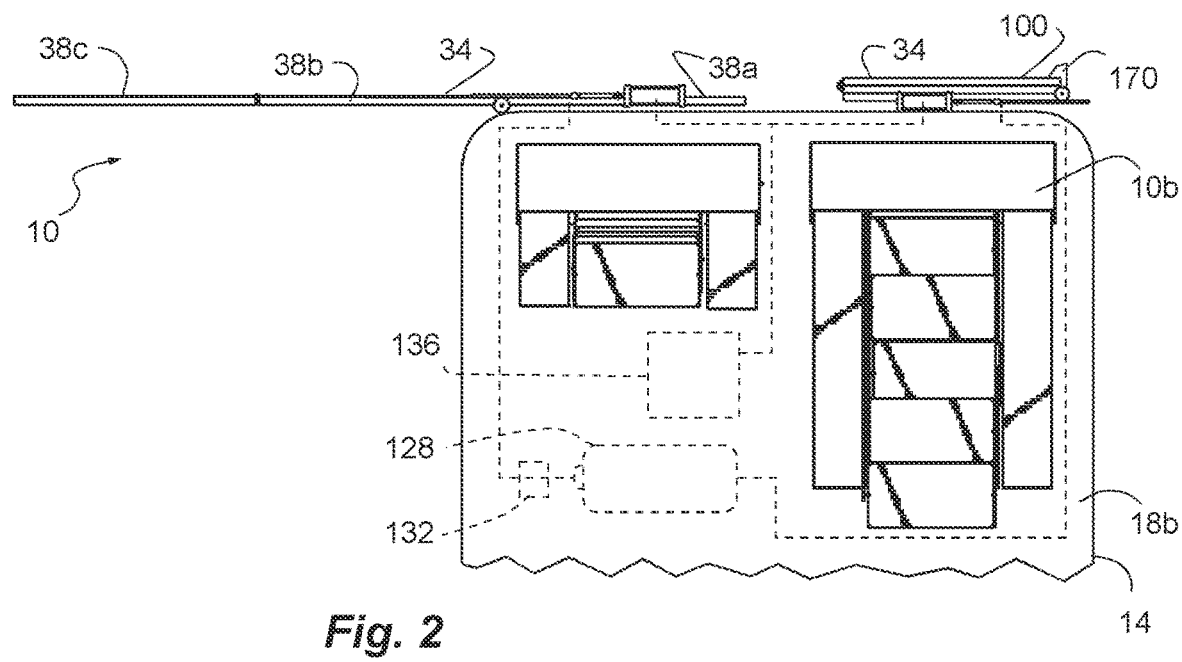
FIG. 2 is a partial end view of the vehicle solar charging system of FIG. 1, shown with the vehicle.
Figure 3:
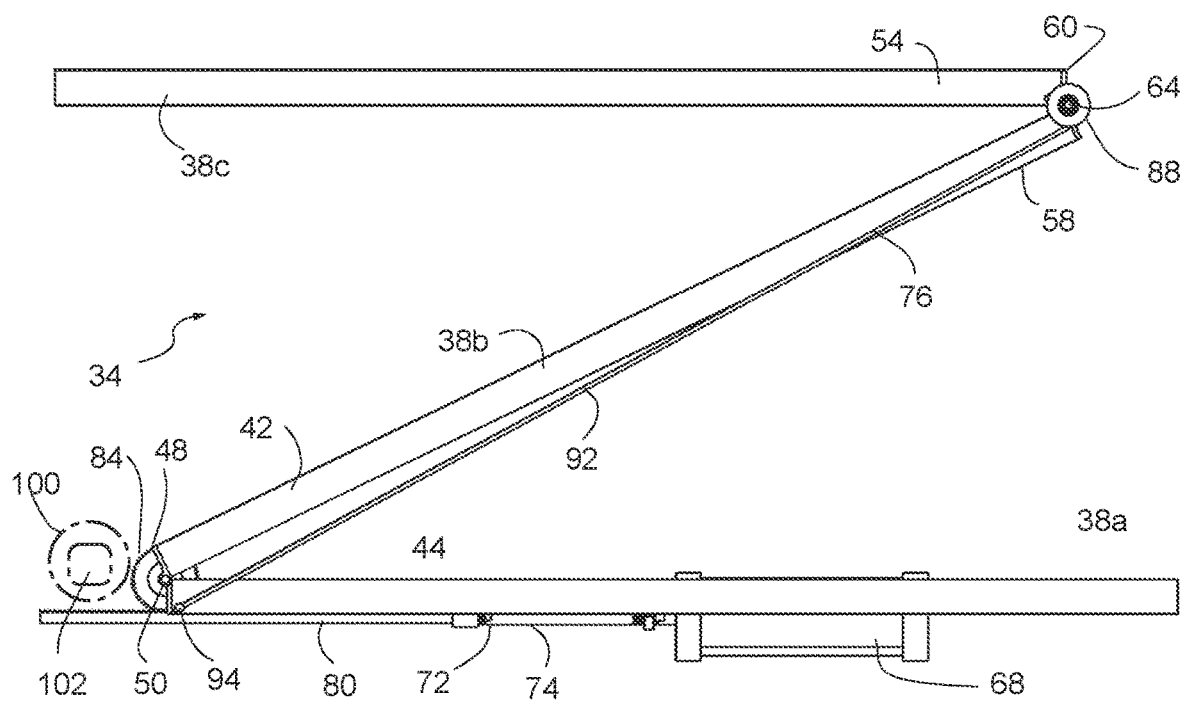
FIG. 3 is a side view of a solar wing of the vehicle solar charging system of FIG. 1, shown partially retracted/deployed, in accordance with an example.
Figure 4:
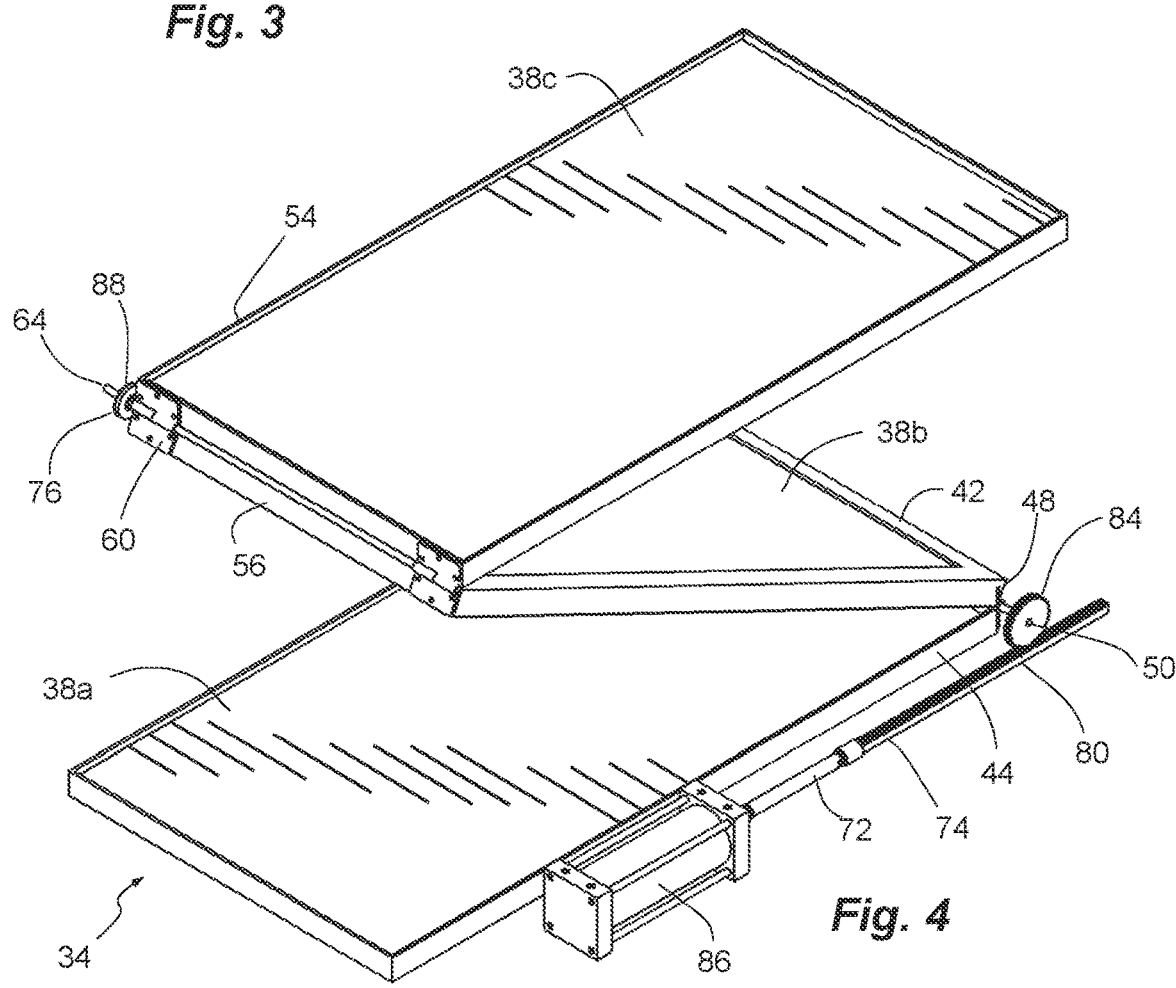
FIG. 4 is a perspective view of the solar wing of the vehicle solar charging system of FIG. 1, shown partially retracted/deployed.

Referring to FIGS. 1 and 2, a vehicle solar charging system 10 is shown by way of example to convert energy from the sun into electrical power. The system 10 can be carried by a vehicle 14, such as an RV, and mounted to a top or roof 18 of the vehicle 14. The system 10 can be located between a perimeter edge 22 of the roof 18 and rooftop accessories 26 or structures. In one aspect, the system 10 can be located proximate to the perimeter edge 22 of the roof 18. In addition, the system 10 can be mounted to other surfaces or structures of the vehicle, such as lateral sides or ends 30 of the vehicle 14.

The solar system 10 can comprise photovoltaic cells. The cells can be exposed to sunlight. Photons from the sunlight can strike the cells and energize the cell to cause electrons to be released and create an electric current. The terms "photovoltaic cells" and "photovoltaic panels" are used interchangeably herein, and are used broadly to refer to any type of device or method that creates an electric charge from light or sunlight.

The system 10 can comprise an array of solar wings 34 that can be mounted to the top or the roof 18 of the vehicle 14. The solar wings 34 can be located between a perimeter edge 22 of the roof 18 and rooftop accessories 26 or structures (in a retracted configuration). In addition, the solar wings 34 can be located proximate to the perimeter edge 22 of the roof 18 (in the retracted configuration). In one aspect, the array of solar wings 34 can comprise at least two solar wings. In another aspect, the array of solar wings 34 can comprise more than one array; such as two arrays. In another aspect, the solar wings 34 can be arrayed in a first array along a first lateral side of the vehicle 14, and arrayed in a second array along a another second lateral side of the vehicle 14. In another aspect, the solar wings 34 can be arrayed along an end of the vehicle. Thus, the solar wings 34 can be located to take advantage of available area of the vehicle 14 without interfering with structure 26, such as antennas or AC units. In addition, the multiple solar wings 34 allow the available area of the vehicle 14 to be efficiently utilized for generating electricity.

Referring to FIGS. 3-8, each solar wing 34 can comprise a series of interconnected solar panels 38*a-c*. A base panel 38*a* can be fixed to the top 18 of the vehicle 14. An intermediate panel 38*b* with a proximal edge 42 can be pivotally coupled to a distal edge 44 of the base panel 38*a*. A proximal hinge 48 can pivotally couple the intermediate panel 38*b* to the base panel 38*a*. The proximal hinge 48 can have a proximal axle 50. In one aspect, the proximal axle 50 can be fixed to the intermediate panel 38*b*, as discussed below. A tip panel 38*c* with a proximal edge 54 can be pivotally coupled to a distal edge 56 of the intermediate panel 38*b*. A distal hinge 60 can pivotally couple the tip panel 38*c* to the intermediate panel 38*b*. The distal hinge 60 can have a distal axle 64. In one aspect, the distal axle 64 can be fixed to the tip panel 38*c*, as discussed below.

In addition, each solar wing 34 can have a motor 68 associated with and coupled to the solar wing 34. In one aspect, the motor 68 can be coupled to the base panel 38*a*. A drive 72 can be coupled to the motor 68 and operatively coupled to the solar panels 38*a-c*. The drive 72 can include a proximal segment 74 coupling the motor 68 to the proximal axle 50 of the proximal hinge 48. As discussed above, the proximal axle 50 can be fixed with respect to the intermediate panel 38*b*. The proximal segment 74 of the drive can rotate the proximal axle 50 to pivot the intermediate panel 38*b* with respect to the base panel 38*a*. A distal segment 76 of the drive 72 can be coupled to the distal axle 64 of the distal hinge 64. As described above, the distal axle 64 can be fixed with respect to the tip panel 38*c*. The distal segment 76 of the drive 72 can rotate the distal axle 64 to pivot the tip panel 38*c* with respect to the intermediate panel 38*b*.

In one aspect, the motor 68 can be a linear motor. The proximal segment 74 of the drive 72 can comprise a rack-and-pinion. A rack 80 can be coupled to the motor 68 and a pinion 84 can be coupled to the proximal axle 50. Linear movement of the rack 80 can turn the pinion 84 and can pivot the intermediate panel 38*b* with respect to the base panel 38*a*. The distal segment 76 of the drive 72 can comprise a cam 88 coupled to the distal axle 64 and a cable 92 with a proximal end 94 coupled to the base panel 38*a* and a distal end 96 coupled to the cam 88. The pivotal movement of the intermediate panel 38*b* can cause the cable 92 to turn the cam 88 and can pivot the tip panel 38*c* with respect to the intermediate panel 38*b*.

In another aspect, the motor can be a rotational motor 100. The proximal segment 74 of the drive 72 can comprise a gear reducer 102 coupled between the rotational motor 100 and the proximal axle 50. Rotation of the motor 100 can pivot the intermediate panel 38*b* with respect to the base panel 38*a*. The distal segment 76 of the drive 72 can comprise a cam 88 coupled to the distal axle 64 and a cable 92 with a proximal end 94 coupled to the base panel 38*a* and a distal end 96 coupled to the cam 88. Pivotal movement of the intermediate panel 38*b* can cause the cable 92 to turn the cam 88 and can pivot the tip panel 38*c* with respect to the intermediate panel 38*b*.

Figure 7:
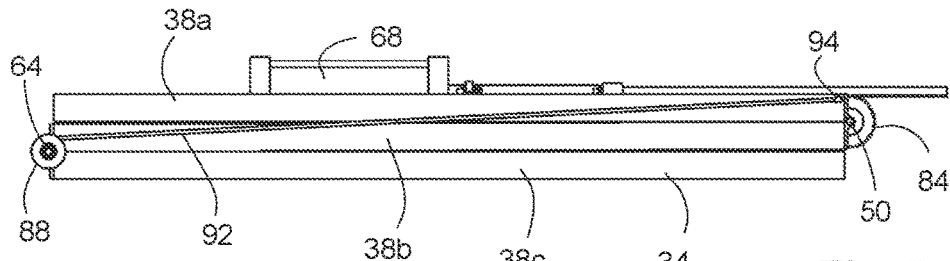
FIG. 7 is an opposite side view of the solar wing of the vehicle solar charging system of FIG. 1, shown retracted.
Figure 5:
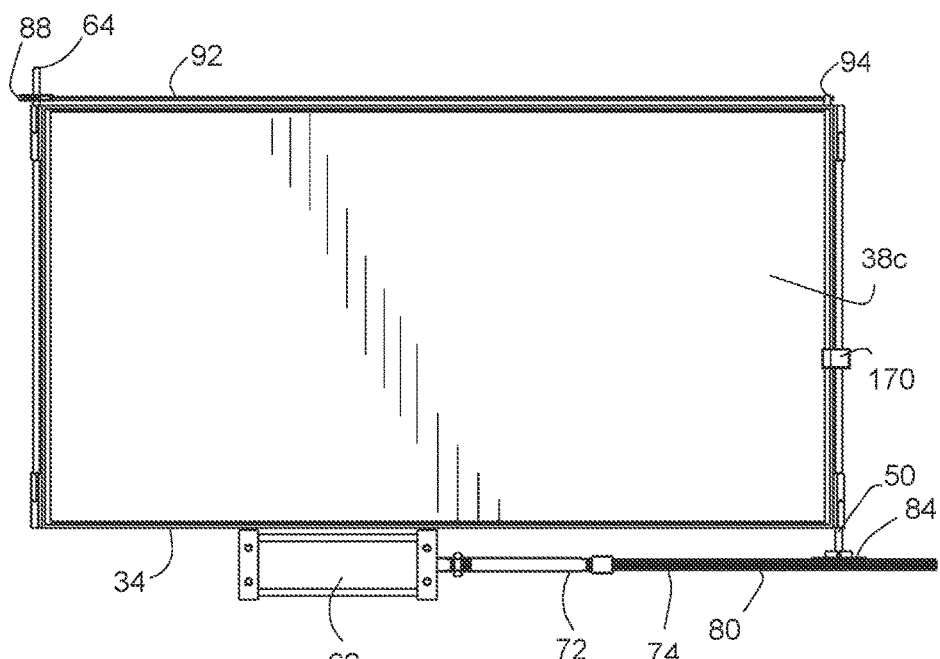
FIG. 5 is a top view of the solar wing of the vehicle solar charging system of FIG. 1, shown retracted.
Figure 8:
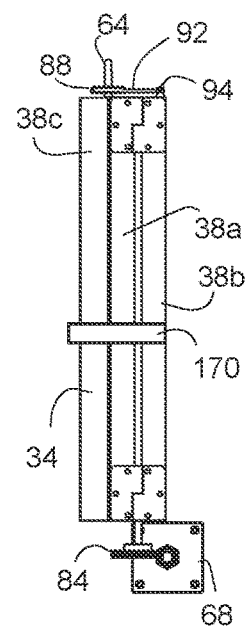
FIG. 8 is an end view of the solar wing of the vehicle solar charging system of FIG. 1, shown retracted.
Figure 6:
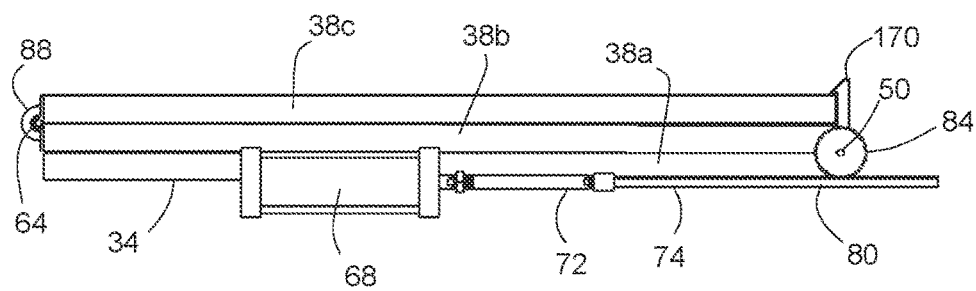
FIG. 6 is a side view of the solar wing of the vehicle solar charging system of FIG. 1, shown retracted.
Figure 9:
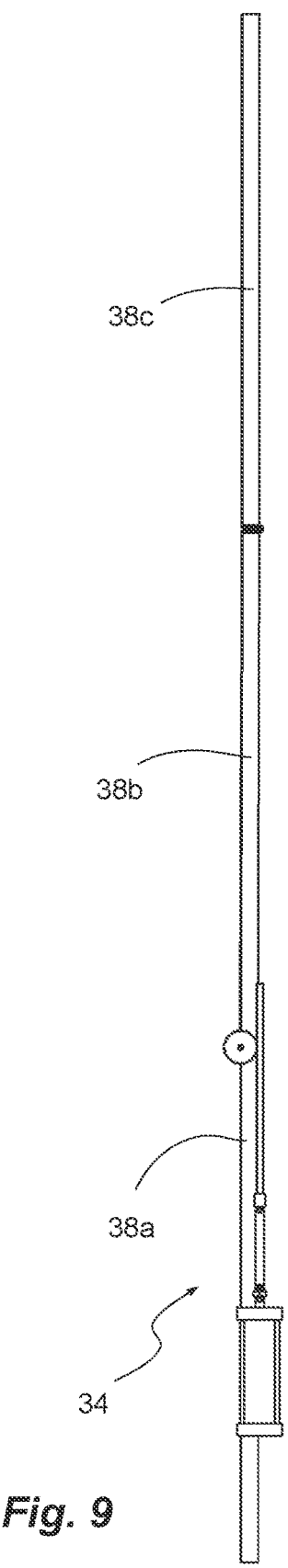
FIG. 9 is a side view of the solar wing of the vehicle solar charging system of FIG. 1, shown deployed.
Figure 10:
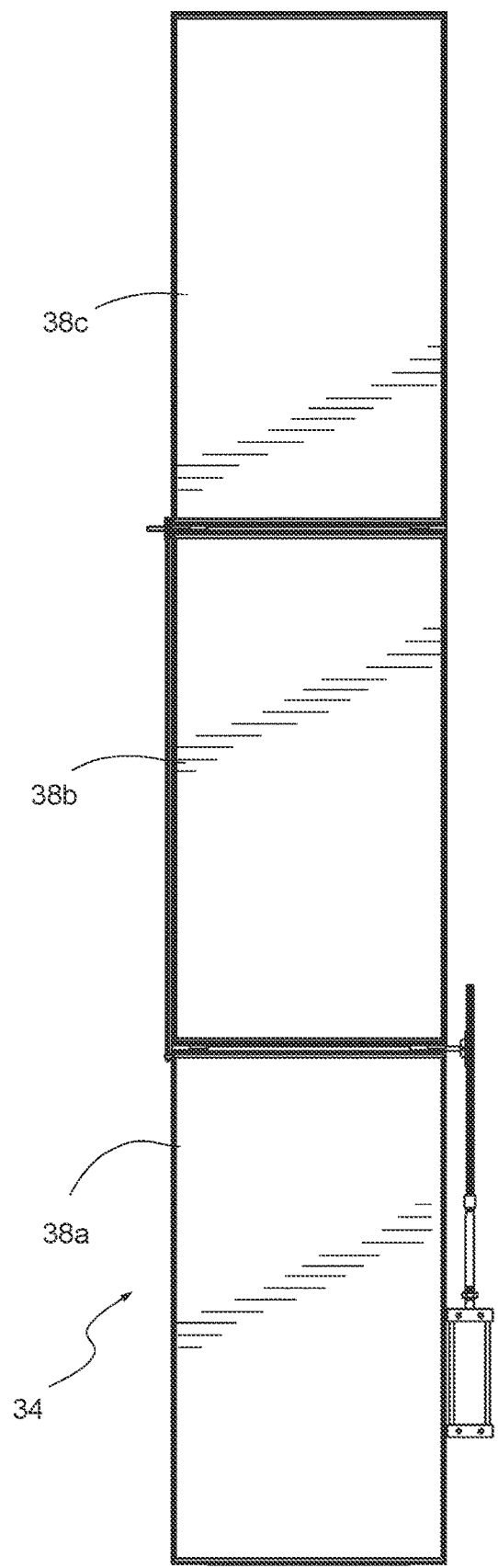
FIG. 10 is a top view of the solar wing of the vehicle solar charging system of FIG. 1, shown deployed.

Referring again to FIGS. 1 and 2, each solar wing 34 can have at least two configurations, including: a retracted configuration, as shown on the right sides of FIGS. 1 and 2; and a deployed configuration, as shown on the left sides of FIGS. 1 and 2, and as shown in FIGS. 9 and 10. In the retracted configuration, the solar panels 38*a-c* can be folded together in a stack 100 with the intermediate panel 38*b* over the base panel 38*a*, and the tip panel 38*c* over the intermediate panel 38*b*, as shown in FIGS. 2, 6 and 7. The retracted configuration can be utilized when the vehicle 14 is in motion or traveling. In the deployed configuration, the solar panels 38*a-c* can extend substantially horizontal in series with the intermediate panel extending 38*b* from the base panel 38*a*, and the tip panel 38*c* extending from the intermediate panel 38*b*, as shown in FIGS. 1, 2, 9 and 10.

In one aspect, proximate solar panels of each solar wing 34 can pivot between 0 degrees and 180 degrees with respect to one another. Thus, the solar panels 38*a-c* can have a substantial 180 degrees of motion with respect to a proximate panel. For example, the intermediate panel 38*b* can rotate substantially 180 degrees with respect to the base panel 38*a*. Similarly, the tip panel 38*c* can rotate substantially 180 degrees with respect to the intermediate panel 38*b*. In one aspect, the tip panel 38*c* and the base panel 38*a* can remain substantially parallel in both the retracted and deployed configurations. In another aspect, the tip panel 38*c* can remain facing upward and exposed in both the retracted and deployed configurations. The base panel 38*a* can remain fixed and facing upward both the retracted and deployed configurations, but is only exposed in the deployed configuration, and is covered by the other panels 38*b* and 38*c* in the retracted configurations. The intermediate panel 38*b* can face upward in the deployed configuration and downward facing the base panel 38*a* in the retracted configuration.

The proximal and distal axles 50 and 64 can be positioned at edges of a thickness of the panels 38*a-c*. Thus, an associated intervening axle of an associated intervening hinge between the proximate solar panels 39*a-c* can be positioned at edges of a thickness of the proximate solar panels. Thus, the edges of the proximal solar panels 38*a-c* can abut to one another in the deployed configuration for support, as shown in FIGS. 9 and 10.

Figure 11:
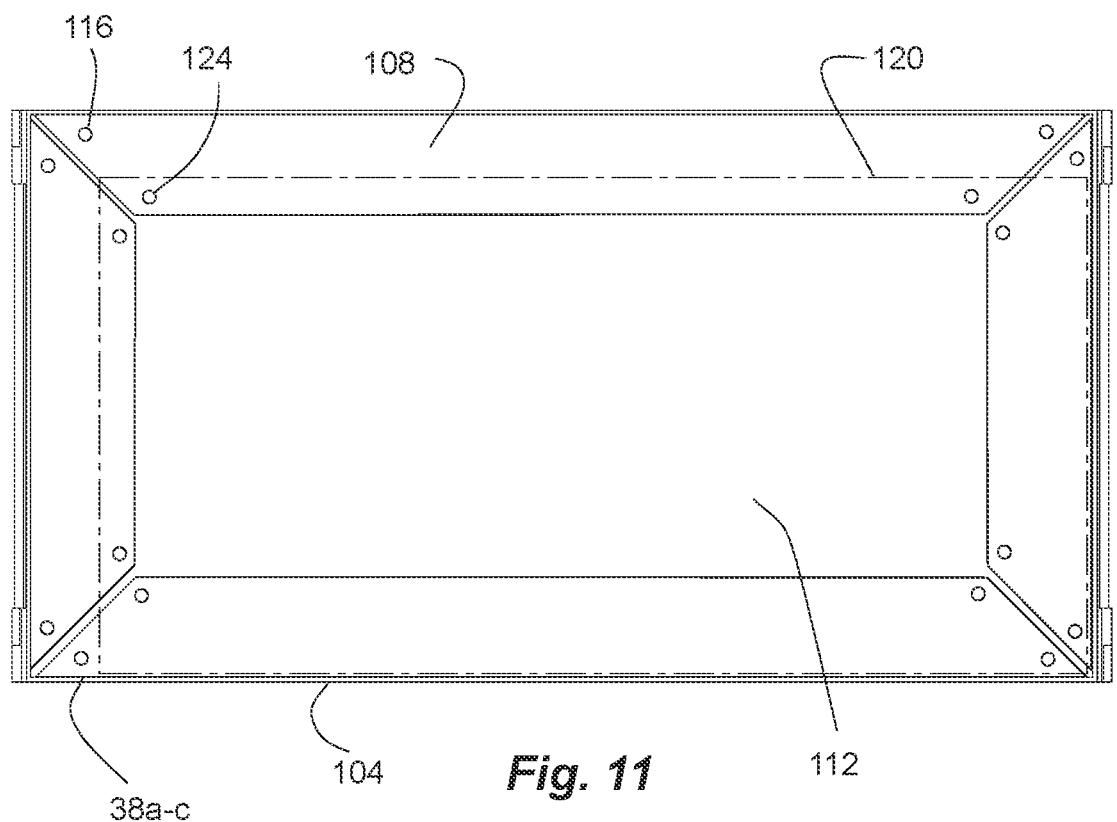
FIG. 11 is a top view of a solar panel of the solar wing of the vehicle solar charging system of FIG. 1, in accordance with an example.

Referring to FIG. 11, each solar panel 38a-c of each solar wing 34 can comprise a perimeter frame 104. The perimeter frame 104 can be formed of metal, such as aluminum angle, and can be formed by cutting and welding. The perimeter frame 104 can have an interior flange 108 extending into an interior 112 of the perimeter frame 104. A plurality of apertures 116 can be formed in the interior flange 108 and positioned at different distances into the interior 112 of the perimeter frame 104. A photovoltaic panel 120 can be carried by the frame 104. The photovoltaic panel 120 can overlap the interior flange 108. The photovoltaic panel 120 can be coupled to the interior flange 108 by fasteners 124 through aligned apertures 116 in the interior flange 108. The apertures 116 can be circular or elongated slots. The apertures 116 positioned at different distances into the interior 112 can accommodate and receive different sized photovoltaic panels 120. In one aspect, the photovoltaic panels 120 in each solar wing 34 can be coupled to a proximate photovoltaic panel 120 so that the photovoltaic panels 120 can be coupled together in series.

In one aspect, the solar wings 34 can be coupled together so that the photovoltaic panels 120 are coupled together. The array of solar wings 34 can be coupled to a rechargeable battery 128 (or a charge controller 132). In another aspect, the solar wings 34 can have a socket or plug carried by base panel of the solar wing to receive the plug or socket of an electrical cord or line. In another aspect, each solar wing 34 can be individually coupled directly to the rechargeable battery 128 (or the charge controller 132). The rechargeable battery 128 can be carried by the vehicle 14 and used to power an electric motor of the vehicle 14 and/or electrical accessories associated with the vehicle 14. The charge controller 132 can control how the solar wings 34 and/or solar panels 38a-c recharge the rechargeable battery 128.

The system 10 can have or can be used with a power source, such as the rechargeable battery 128. The power source can be associated with the array of solar wings 34 and coupled to each motor 68 of the solar wings 34. In one aspect, the power source can be a battery carried by the vehicle 14, such as the rechargeable battery 128. In another aspect, the power source can be a plurality of individual batteries with each battery carried by and coupled to a respective solar wing 34.

The system 10 can also have a controller 136 operatively coupled to each motor 68 of each solar wing 34 of the array of solar wings 34. The controller 136 can be configured to sequentially activate each motor 68 in sequence in order to sequentially deploy each solar wing 34 from the retracted configuration to the deployed configuration. In addition, the controller 136 can be configured to sequentially activate each motor 68 in sequence in order to sequentially retract each solar wing 34 from the deployed configuration to the retracted configuration. In another aspect, the controller 136 can be configured to selectively activate a select motor 68 of the array of solar wings 34 to selectively deploy and/or retract a select solar wing 34 of the array of solar wings 34. Thus, in one aspect, only select solar wings 34 can be deployed and/or retracted.

Figure 12:
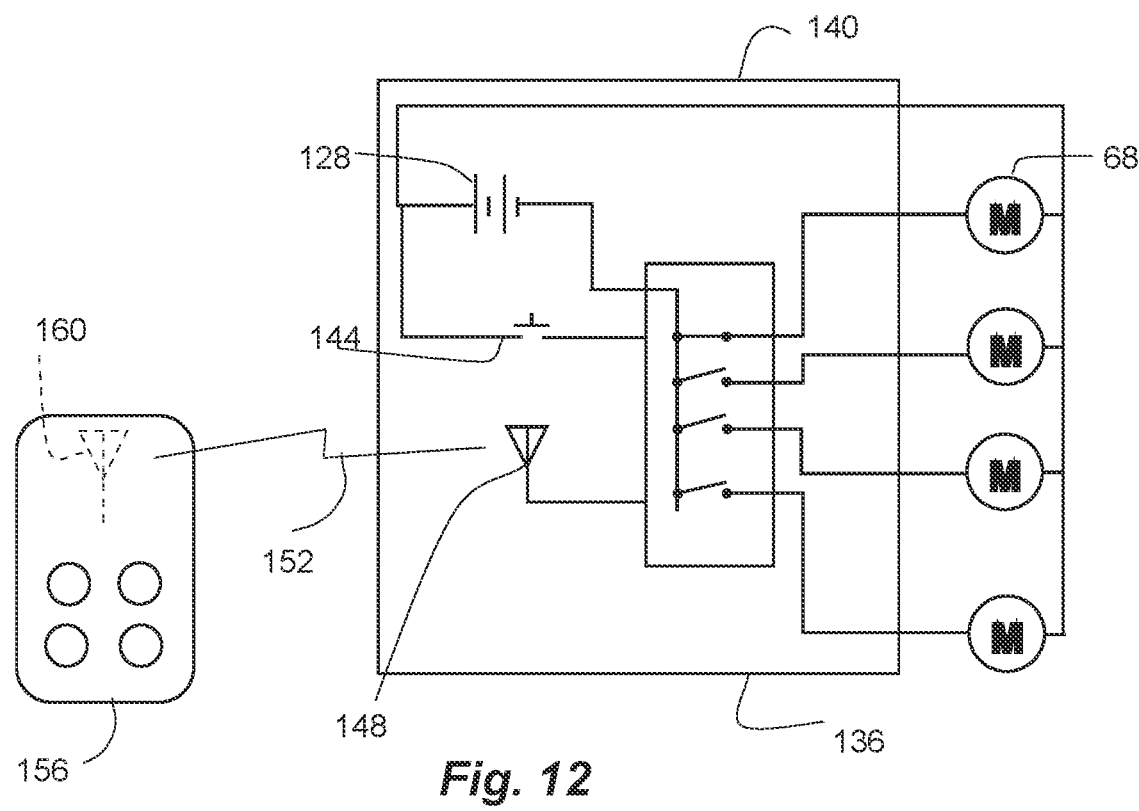
FIG. 12 is a schematic view of a controller of the solar wing of the vehicle solar charging system of FIG. 1, in accordance with an example.
Figure 13:
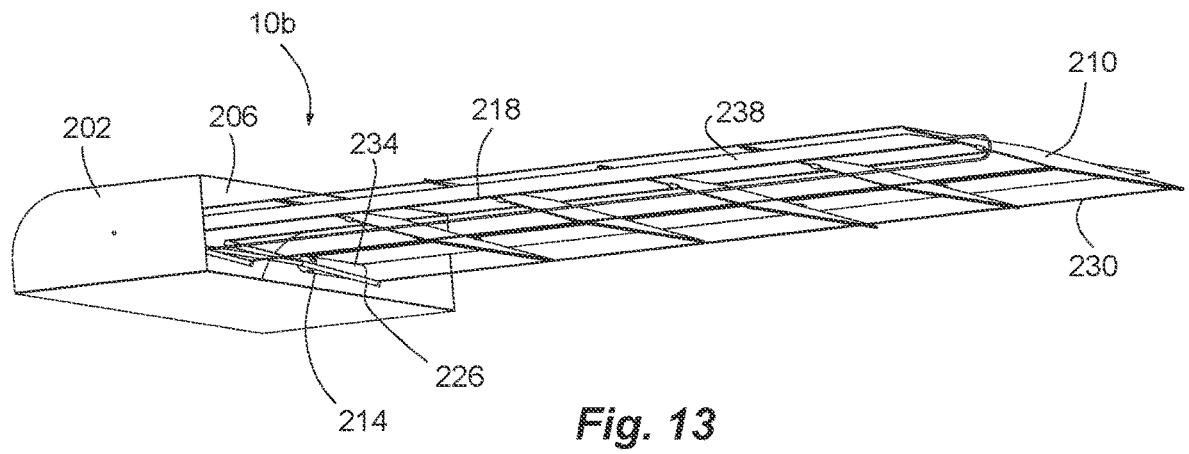
FIG. 13 is a perspective view of a solar stack of the solar charging system of FIG. 1, shown deployed, in accordance with an example.
Figure 14:
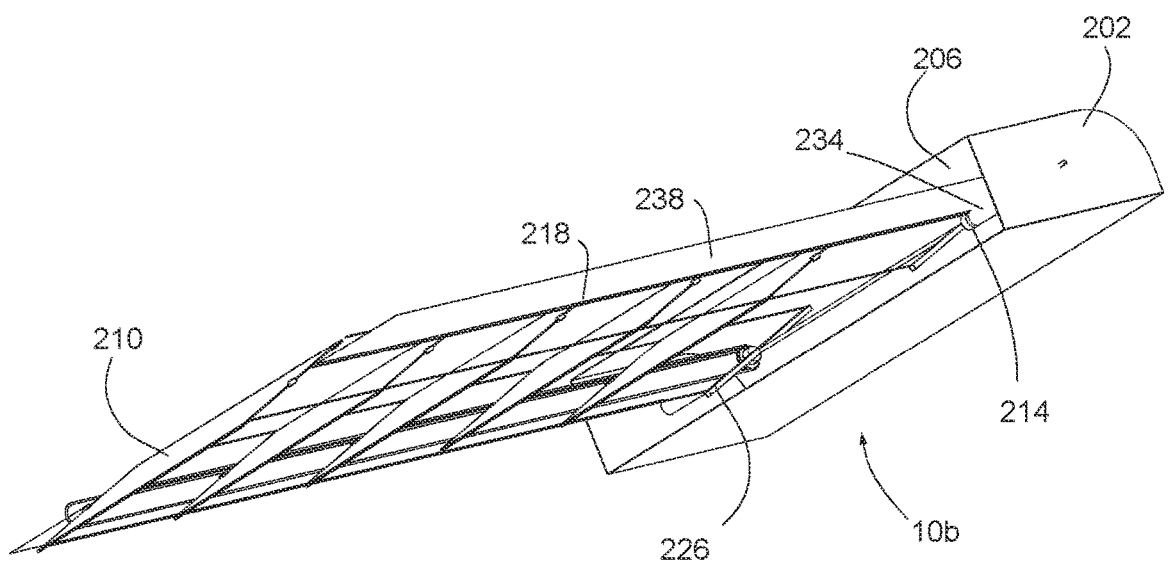
FIG. 14 is a perspective view of the solar stack of the solar charging system of FIG. 1, shown deployed.
Figure 15:
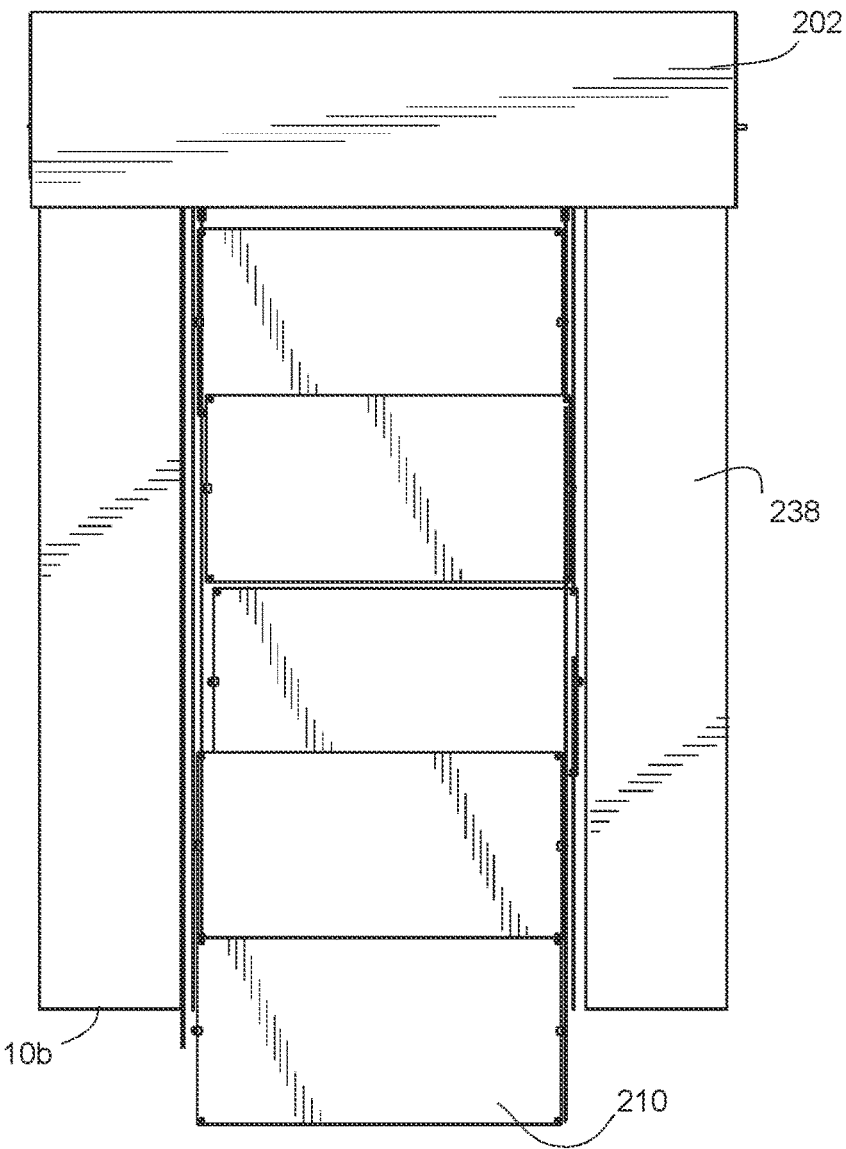
FIG. 15 is a front view of the solar stack of the solar charging system of FIG. 1, shown deployed.
Figure 16:
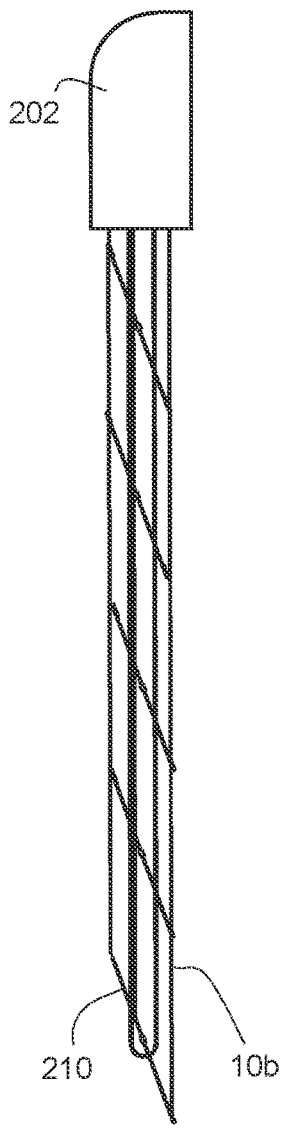
FIG. 16 is a side view of the solar stack of the solar charging system of FIG. 1, shown deployed.

Referring to FIG. 12, in another aspect, the controller 136 can have circuitry 140 coupled to the power source (e.g. the rechargeable battery 128) and each of the motors 68 of each solar wing 34. An input 144 can be coupled to the circuitry 140. The input 144 can be a button. The circuitry 140 can be configured to sequentially activate each motor 68. Thus, the solar system 10 can be controlled on location. In another aspect, the controller 136 and the circuitry 140 can have a receiver 148, such as an antenna, coupled to the circuitry 140 to receive a signal, indicated by 152. A remote 156 can have a transmitter 160, such as an antenna, to transmit a signal, indicated by 152, to the receiver 148. Thus, the solar system 10 can be controlled remotely. The receiver 148 and the transmitter 160 can be transceivers.

Referring again to FIGS. 1 and 2, in another aspect, each solar wing 34 can have a clip 170 positioned to engage the tip panel 38c in the retracted configuration. The clip 170 can be mounted to the base panel 38a or the roof 18 of the vehicle 14. The clip 170 can bear against the tip panel 38c in the retracted configuration. The clip 170 can be flexible and resilient to apply a force to the tip panel 38c. The clip 170 can help to reduce vibration of the solar wing 34 when the vehicle 14 is in motion.

A method for converting solar energy into electrical power and for using the solar system 10 described herein can comprise deploying each solar wing 34 of the array of solar wings 34 sequentially from the retracted configuration to the deployed configuration; and retracting each solar wing 34 of the array of solar wings 34 sequentially from the deployed configuration to the retracted configuration.

As mentioned above, the solar system 10 can also have other solar arrays mounted to other surfaces of the vehicle 14. For example, the solar system 14 can have one or more solar stacks 10b mounted to a side 18b of the vehicle 14. The solar stack 10b can have an array of solar panels that can function as both generating electricity from sun light, and covering vehicle features, such as windows.

Figure 17:
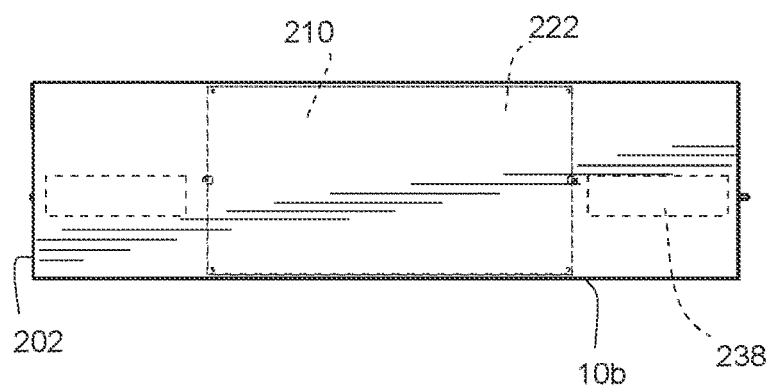
FIG. 17 is a front view of the solar stack of the solar charging system of FIG. 1, shown retracted.
Figure 18:
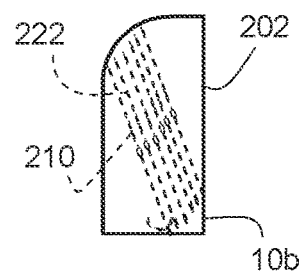
FIG. 18 is a side view of the solar stack of the solar charging system of FIG. 1, shown retracted.

Referring to FIGS. 13-18, each solar stack 10b can have a housing 202 that can be mounted to the side 18b of the vehicle 14. The housing 202 can have an interior 206 with an opening in the side or an open side. A plurality of solar slats 210 can be coupled to and pendent from the housing 202 to form a solar array or array of solar slats 210. The solar slats 210 can form an array of solar panels that are arrayed substantially vertically and that can have or can be photovoltaic panels, as described herein. In one aspect, the photovoltaic panels can be flexible. A retraction reel 214 can be coupled to the housing 202, positioned in the interior 206, and rotatable with respect to the housing 202. The retraction reel 214 can be motorized or manually operated. A retraction line 218 can be coupled to the retraction reel 214 and pendent from the housing 202. The plurality of solar slats 210 can be coupled to the retraction line 218 and pendent from the housing 202 on the retraction line 218. The plurality of solar slats 210 can have at least two configurations, including: a deployed configuration, as shown in FIGS. 13-16 and the right side of FIG. 2, and a retracted configuration, as shown in FIGS. 17 and 18, and the left side of FIG. 2. In the deployed configuration, the plurality of solar slats 210 can be arranged in series at different elevational positions, with one over another in sequence, and outside of the housing 202. The solar slats 210 can be deployed to receive sun light and also to cover vehicle features, such as windows. In the retracted configuration, the plurality of solar slats 210 can be arranged in an overlapping stack 222 at substantially the same elevation and located within the interior 206 of the housing 202. Thus, the solar slats 210 can be retracted into the housing 202 when the vehicle 14 is traveling.

In addition, a control arm 226 can be carried by the housing 202, pivotal with respect to the housing 202, and located in the interior 206 of the housing 202. A guide line 230 can be coupled to and between the control arm 226 and the plurality of solar slats 210. The control arm 226 can be selectively pivotal to selectively orient the plurality of solar slats 210. Thus, the solar slats 210 can be oriented with respect to direct sun light.

In another aspect, a shade reel 234 can be carried by the housing 202, rotatable with respect to the housing 202, and located in the interior 206 of the housing 202. A shade 238 can be pendent from the shade reel 234 and the housing 202 and positioned proximate the plurality of solar slats 210. In one aspect, a pair of shade reels 234 and a pair of shades 238 can be provided with the solar slats 210 therebetween. In another aspect, the shade can be flexible and opaque. The shade reel 234 can be selectively rotatable to deploy and retract the shade 238. The shade 238 can cover vehicle features, such as windows, that are still exposed by the solar slats 210 in the deployed configuration.

In another aspect, the number of solar slats 210 can be selected. The solar slats 210 can be removably coupled to the array of solar slats, and can be removably coupled to the retraction line 218 and the guide line 230. At least one solar slat 210 can be selectively removable and couplable to the retraction line 218 and the guide line 230. Thus, a vertical length or height of the plurality of solar slats 210 in the deployed configuration can be selected as desired to match a height of the vehicle and/or to cover a vehicle feature, such as a window. Lengths of the retraction line 128 and the guide line 230 can be shortened or lengthened with respect to the retraction reel 214 and the control arm 226 to accommodate the number of solar slats 210.

In another aspect, the solar slats 210 and the photovoltaic panels can be flexible. Thus, the solar slats 210 can have a support member or bar.

In another aspect, the retraction reel 214 can be coupled to a motor to retract and deploy the solar slats 210 between the retracted and deployed configurations. The motor can be coupled to a controller and a remote, as described above with respect to the solar wings.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A solar system configured to be carried by a vehicle, the system comprising:
    a) an array of solar wings configured to be mounted to a top of a vehicle, each solar wing comprising:
        i) a series of interconnected solar panels including:
            A) a base panel configured to be fixed to the top of the vehicle;
            B) an intermediate panel with a proximal edge pivotally coupled to a distal edge of the base panel;
            C) a proximal hinge pivotally coupling the intermediate panel to the base panel and having a proximal axle;
            D) a tip panel with a proximal edge pivotally coupled to a distal edge of the intermediate panel; and
            E) a distal hinge pivotally coupling the tip panel to the intermediate panel and having a distal axle;
        ii) a motor associated with and coupled to the solar wing;
        iii) a drive coupled to the motor and operatively coupled to the solar panels, the drive including:
            A) a proximal segment coupling the motor to the proximal axle of the proximal hinge, the proximal segment coupled to the proximal axle, the proximal axle being rotationally fixed with respect to the intermediate panel, and the proximal segment of the drive configured to rotate the proximal axle to pivot the intermediate panel with respect to the base panel; and
            B) a distal segment coupled to the distal axle of the distal hinge, the distal axle being rotationally fixed with respect to the tip panel, and the distal segment of the drive configured to rotate the distal axle to pivot the tip panel with respect to the intermediate panel;
    b) each solar wing having at least two configurations, including:
        i) a retracted configuration in which the solar panels are folded together in a stack with the intermediate panel over the base panel and the tip panel over the intermediate panel; and
        ii) a deployed configuration in which the solar panels extend substantially horizontal in series with the intermediate panel extending from the base panel and the tip panel extending from the intermediate panel;
    c) a power source associated with the array of solar wings and coupled to each motor; and
    d) a controller operatively coupled to each motor of each solar wing of the array of solar wings, the controller configured to:
        i) sequentially activate each motor to sequentially deploy each solar wing from the retracted configuration to the deployed configuration; and
        ii) sequentially activate each motor to sequentially retract each solar wing from the deployed configuration to the retracted configuration.

2. The solar system in accordance with claim 1, wherein:
proximate solar panels of each solar wing pivot between 0 degrees and 180 degrees with respect to one another; and
an associated intervening axle of an associated intervening hinge between the proximate solar panels is positioned at edges of a thickness of the proximate solar panels with the edges of the proximal solar panels abutting to one another in the deployed configuration.

3. The solar system in accordance with claim 1, wherein each motor is a linear motor; and wherein the drive of each solar wing further comprises:
    a) the proximal segment comprising a rack-and-pinion with a rack coupled to the motor and a pinion coupled to the proximal axle with movement of the rack turning the pinion and pivoting the intermediate panel; and
    b) the distal segment comprising a cam coupled to the distal axle and a cable with a proximal end coupled to the base panel and a distal end coupled to the cam with movement of the intermediate panel causing the cable to turn the cam and pivot the tip panel.

4. The solar system in accordance with claim 1, wherein each motor is a rotational motor; and wherein the drive of each solar wing further comprises:
    a) the proximal segment comprising a gear reducer coupled between the rotational motor and the proximal axle with rotation of the motor pivoting the intermediate panel; and
    b) the distal segment comprising a cam coupled to the distal axle and a cable with a proximal end coupled to the base panel and a distal end coupled to the cam with movement of the intermediate panel causing the cable to turn the cam and pivot the tip panel.

5. The solar system in accordance with claim 1, wherein:
the controller is configured to selectively activate a motor of the array of solar wings to selectively deploy and/or retract a select solar wing of the array of solar wings.

6. The solar system in accordance with claim 1, wherein controller further comprises:
    a) circuitry coupled to the power source and each of the motors of each solar wing;
    b) an input coupled to the circuitry; and
    c) the circuitry configured to sequentially activate each motor.

7. The solar system in accordance with claim 1, wherein controller further comprises:

a) circuitry coupled to the power source and each of the motors of each solar wing;
b) a receiver coupled to the circuitry and configured to receive a signal; and
c) a remote with a transceiver configured to transmit a signal to the receiver.

8. The solar system in accordance with claim 1, wherein each solar wing further comprises:
   a) a clip positioned to engage the tip panel in the retracted configuration; and
   b) the clip bearing against the tip panel in the retracted configuration.

9. The solar system in accordance with claim 1, wherein each solar panel of each solar wing further comprises:
   a) a perimeter frame with an interior flange extending into an interior of the perimeter frame;
   b) a plurality of apertures in the interior flange and positioned at different distances into the interior of the perimeter frame;
   c) a photovoltaic panel carried by the frame and coupled to the interior flange; and
   d) the photovoltaic panel overlapping the interior flange.

10. The solar system in accordance with claim 1, further comprising:
    a) at least one solar stack configured to be mounted to a side of the vehicle and comprising:
    b) a housing configured to be mounted to the side of the vehicle and having an interior and an open side;
    c) a retraction reel coupled to the housing and rotatable with respect to the housing;
    d) a retraction line coupled to the retraction reel and pendent from the housing;
    e) a plurality of solar slats coupled to the retraction line and pendent from the housing;
    d) the plurality of solar slats having at least two configurations, including:
       i) a deployed configuration with the plurality of solar slats arranged in series at different elevational positions; and
       ii) a retracted configuration with the plurality of solar slats arranged in an overlapping stack at substantially the same elevation and located within the interior of the housing.

11. The solar system in accordance with claim 10, further comprising:
    a) a control arm carried by the housing and pivotal with respect to the housing; and
    b) a guide line coupled to and between the control arm and the plurality of solar slats; and
    c) wherein the control arm is selectively pivotal to selectively orient the plurality of solar slats.

12. The solar system in accordance with claim 10, further comprising:
    a) a shade reel carried by the housing and rotatable with respect to the housing;
    b) a shade pendent from the shade reel and the housing and positioned proximate the plurality of solar slats; and
    c) wherein the shade reel is selectively rotatable to deploy and retract the shade.

13. The solar system in accordance with claim 10, further comprising:
    each of the plurality of solar slats is flexible.

14. The solar system in accordance with claim 10, wherein:
    at least one of the solar slats is releasable couplable to the retraction line and is selectively removable and couplable to the retraction line.

15. The solar system in accordance with claim 1 in combination with the vehicle, the combination comprising:
    a) the array of solar wings mounted to the top of the vehicle;
    b) at least two solar wings of the array of solar wings positioned on one side of the vehicle;
    c) at least two solar wings of the array of solar wings positioned on another side of the vehicle;
    d) a rechargeable battery carried by the vehicle and electrically coupled to the array of solar wings; and
    e) the controller mounted to the vehicle.

16. A solar system configured to be carried by a vehicle, the system comprising:
    a) an array of solar wings configured to be mounted to a top of a vehicle, each solar wing comprising:
       i) a series of interconnected solar panels including:
          A) a base panel configured to be fixed to the top of the vehicle;
          B) an intermediate panel with a proximal edge pivotally coupled to a distal edge of the base panel;
          C) a proximal hinge pivotally coupling the intermediate panel to the base panel and having a proximal axle;
          D) a tip panel with a proximal edge pivotally coupled to a distal edge of the intermediate panel; and
          E) a distal hinge pivotally coupling the tip panel to the intermediate panel and having a distal axle;
       ii) a motor associated with and coupled to the solar wing;
       iii) a drive coupled to the motor and operatively coupled to the solar panels;
    b) each solar wing having at least two configurations, including:
       i) a retracted configuration in which the solar panels are folded together in a stack with the intermediate panel over the base panel and the tip panel over the intermediate panel; and
       ii) a deployed configuration in which the solar panels extend substantially horizontal in series with the intermediate panel extending from the base panel and the tip panel extending from the intermediate panel;
    c) a power source associated with the array of solar wings and coupled to each motor; and
    d) a controller operatively coupled to each motor of each solar wing of the array of solar wings, the controller configured to:
       i) sequentially activate each motor to sequentially deploy each solar wing from the retracted configuration to the deployed configuration; and
       ii) sequentially activate each motor to sequentially retract each solar wing from the deployed configuration to the retracted configuration.

17. The solar system in accordance with claim 16, wherein the drive of each solar wing further comprises:
    i) a proximal segment coupling the motor to the proximal axle of the proximal hinge, the proximal segment coupled to the proximal axel, the proximal axle being rotationally fixed with respect to the intermediate panel, and the proximal segment of the drive configured to rotate the proximal axle to pivot the intermediate panel with respect to the base panel; and ii) a distal segment coupled to the distal axle of the distal hinge, the distal axle being rotationally fixed with respect to the tip panel, and the distal segment of the drive configured to rotate the distal axle to pivot the tip panel with respect to the intermediate panel.

18. A solar system configured to be carried by a vehicle, the system comprising:
    a) an array of solar wings configured to be mounted to a top of a vehicle, each solar wing comprising:
        i) a series of interconnected solar panels including:
            A) a base panel configured to be fixed to the top of the vehicle;
            B) an intermediate panel with a proximal edge pivotally coupled to a distal edge of the base panel;
            C) a proximal hinge pivotally coupling the intermediate panel to the base panel and having a proximal axle;
            D) a tip panel with a proximal edge pivotally coupled to a distal edge of the intermediate panel; and
            E) a distal hinge pivotally coupling the tip panel to the intermediate panel and having a distal axle;
        ii) a motor associated with and coupled to the solar wing;
        iii) a drive coupled to the motor and operatively coupled to the solar panels, the drive including:
            A) a rack-and-pinion with a rack coupled to the motor and a pinion coupled to the proximal axle with movement of the rack turning the rack and pivoting the intermediate panel with respect to the base panel; and
            B) a cam coupled to the distal axle and a cable with a proximal end coupled to the base panel and a distal end coupled to the cam with movement of the intermediate panel causing the cable to turn the cam and the tip panel with respect to the intermediate panel;
    b) each solar wing having at least two configurations, including:
        i) a retracted configuration in which the solar panels are folded together in a stack with the intermediate panel over the base panel and the tip panel over the intermediate panel; and
        ii) a deployed configuration in which the solar panels extend substantially horizontal in series with the intermediate panel extending from the base panel and the tip panel extending from the intermediate panel;
    c) a power source associated with the array of solar wings and coupled to each motor; and
    d) a controller operatively coupled to each motor of each solar wing of the array of solar wings.

19. The solar system in accordance with claim 18, wherein the controller is further configured to:
    a) sequentially activate each motor to sequentially deploy each solar wing from the retracted configuration to the deployed configuration; and
    b) sequentially activate each motor to sequentially retract each solar wing from the deployed configuration to the retracted configuration.

20. The solar system in accordance with claim 1, wherein: the distal segment comprising a cam coupled to the distal axle and a cable with a proximal end coupled to the base panel and a distal end coupled to the cam with movement of the intermediate panel causing the cable to turn the cam and pivot the tip panel.

* * * * *